United States Patent [19]
Saunders et al.
[11] 4,350,738
[45] Sep. 21, 1982

[54] POWER INSERTABLE POLYAMIDE-IMIDE COATED MAGNET WIRE

[75] Inventors: Hollis S. Saunders; Richard V. Carmer; Lionel J. Payette, all of Fort Wayne, Ind.
[73] Assignee: Essex Group, Inc., Fort Wayne, Ind.

[21] Appl. No.: 310,681
[22] Filed: Oct. 13, 1981
[51] Int. Cl.[3] .......... B32B 27/00; H01B 7/00
[52] U.S. Cl. .......... 428/383; 29/596; 174/110 N; 174/120 SR; 427/118; 427/120
[58] Field of Search .......... 428/375, 379, 383; 174/120 SR, 120 C, 110 N, 110 SR; 427/118, 120; 252/52 R, 54, 56 R, 56 S, 58; 29/596, 598, 606; 242/1.1 R, 1.1 A, 7.03, 7.05 A, 7.05 B, 7.05 C, 7.06, 7.07

[56] References Cited

U.S. PATENT DOCUMENTS

| | | | |
|---|---|---|---|
| 3,361,593 | 1/1968 | Sattler et al. | 428/383 |
| 3,413,148 | 11/1968 | Sattler et al. | 117/218 |
| 3,428,486 | 2/1969 | George | 428/383 |
| 3,446,660 | 5/1969 | Pendleton | 117/218 |
| 3,493,413 | 2/1970 | Olson et al. | 174/110 N |
| 3,523,820 | 8/1970 | Sheffer | 174/110 N |
| 3,554,984 | 1/1971 | George | 428/383 X |
| 3,632,440 | 1/1972 | Preston | 117/218 |
| 3,775,175 | 11/1973 | Merian | 117/218 |
| 3,817,926 | 6/1974 | Pauze et al. | 427/120 X |
| 3,856,566 | 2/1973 | Saunders | 117/218 |
| 3,922,465 | 11/1975 | Kawaguchi et al. | 427/118 X |
| 4,002,797 | 1/1977 | Hacker et al. | 428/378 |
| 4,216,263 | 8/1980 | Otis et al. | 428/383 |

FOREIGN PATENT DOCUMENTS

| | | | |
|---|---|---|---|
| 46-22986 | 6/1971 | Japan | 174/120 SR |
| 55-62607 | 5/1980 | Japan | 174/120 SR |
| 55-80207 | 6/1980 | Japan | 174/120 SR |
| 55-80208 | 6/1980 | Japan | 174/120 SR |
| 55-88211 | 7/1980 | Japan | 428/383 |
| 1333939 | 10/1973 | United Kingdom | 428/383 |

OTHER PUBLICATIONS

Published European Patent Application No. 0-033-244, published Aug. 5, 1981 (Bulletin 8/31).
"Motor Winding Insertion" by Cal Towne, presented at the Electrical/Electronics Insulation Conf., Boston, Mass., Sep. 1979.

*Primary Examiner*—Lorraine T. Kendell
*Attorney, Agent, or Firm*—Harry J. Gwinnell

[57] ABSTRACT

A magnet wire having a polyamide-imide outer coating is described which is capable of multiple winding power insertion into coil slots without damage by virtue of an improved lubricant outer coating. The lubricant comprises a mixture of oleic acid, beeswax, fluorocarbon surfactant and paraffin wax.

3 Claims, No Drawings

POWER INSERTABLE POLYAMIDE-IMIDE COATED MAGNET WIRE

DESCRIPTION

1. Technical Field

The field of art to which this invention pertains is lubricant coatings for electrical conductors, and specifically lubricant coated magnet wire.

2. Background Art

In the manufacture of electrical motors, the more magnet wire which can be inserted into a stator core, the more efficient the motor performance. In addition to motor efficiency considerations, motor manufacturers are also interested in manufacture efficiency. Accordingly, such coils can be inserted automatically, generally by two methods: either a gun-winding method or a slot insertion method. In the older gun-winding method, the winding is done by carrying the wire into the stator slot by means of a hollow winding needle. Turns are made by the circular path of the gun to accommodate the individual coil slots. As described in Cal Towne's paper entitled "Motor Winding Insertion" presented at the Electrical/Electronics Insulation Conference, Boston, Massachusetts in September, 1979, in the more preferred slot insertion method, coils are first wound on a form, placed on a transfer and then pressed off the transfer tool into the stator core slots through insertion guides or blades. In order to accommodate these automated insertion methods, wire manufacturers have responded by producing magnet wires with insulating coatings with low coefficients of friction. Note, for example, U.S. Pat. Nos. 3,413,148; 3,446,660; 3,632,440; 3,775,175; 3,856,566; 4,002,797; 4,216,263; and Published European Patent Application No. 0-033-244, published Aug. 5, 1981 (Bulletin 8/31).

However, conventional lubricants for polyamide-imide insulated magnet wires do not allow for power insertion of all the windings simultaneously into the coil slots. Accordingly, it is necessary to power insert these windings into the coil slots in two, three, four, etc. separate power insertion operations in order to provide all of the wire required for a particular stator design.

Accordingly, what is needed in this art is a magnet wire having a polyamide-imide insulation outer coating which can be power inserted into coil slots in a multiplicity of windings so as to provide in one step all of the wire required for a particular stator design.

DISCLOSURE OF INVENTION

The present invention is directed to magnet wire having an outermost insulating layer of polyamide-imide overcoated with a lubricant which allows it to be safely power inserted into coil slot openings in a multiplicity of windings without damage to the insulation. The multiplicity of windings can represent all of the wire required for a particular stator design which can be inserted according to the present invention in one power insertion operation. The lubricant coating comprises a mixture of oleic acid, beeswax, a fluorocarbon surfactant and paraffin wax.

Another aspect of the invention includes a method of producing such lubricated wires by applying the lubricant composition in solution to the wires and drying the thus coated wires.

Another aspect of the invention includes the method of power inserting such wires into coil slots.

The foregoing, and other features and advantages of the present invention, will become more apparent from the following description.

BEST MODE FOR CARRYING OUT THE INVENTION

It is important to use the components of the lubricant composition according to the present invention in particular porportions. In solution in aliphatic hydrocarbon solvent, the oleic acid should be present in an amount about 0.1% to about 4.0% by weight, tfhe beeswax about 0.05% to about 1.0% by weight, the fluorocarbon surfactant about 0.001% to about 1.0% by weight, and the paraffin wax about 0.1% to about 4.0% by weight, with balance solvent. The preferred composition comprises by weight 0.75% oleic acid, 0.30% beeswax, 0.01% fluorocarbon surfactant, and 0.5% paraffin wax. While solution application is preferred, if solventless (i.e. molten) application is used, about 3.2% to about 56.8% by weight beeswax should be used, about 0.06% to about 39% by weight fluorocarbon surfactant, with balance oleic acid and paraffin wax in a ratio of about 1.5 to 1.

The oleic acid can be purchased from any commercial source or synthesized by general, well known synthesis methods and has the formula:

$$CH_3(CH_2)_7CH{=}CH(CH_2)_7CO_2H.$$

The beeswax is preferably of insect source having a melting point of 142° F. (61° C.). Mismo Beeswax by International Wax Refining Co., Inc. having an Acid No. of 19, a saponification value of 90, specific gravity at 25° C. of 0.95 to 0.96, and a refractive index of 1.440 to 1.445 has been found to be particularly suitable.

The fluorocarbon surfactant is preferably nonionic and soluble in low polarity organic solvents. FC-432, a fluorinated alkyl ester available from Minnesota Mining and Manufacturing Co., having a solubility of over 80 gms/100 gms of solvent in such solvents as trichloroethane, perchloroethylene, toluene, benzene and heptane, and at 25% by weight in heptane having specific gravity (at 25° C.) of 0.78, refractive index (at 25° C.) of 1.40, and a flash point (Tag closed cup) of 19.4° F. (−7° C.) has been found to be particularly suitable. The paraffin wax is preferably petroleum based having a melting point of 122° F. to 127° F. (50° C. to 52.8° C.). Eskar R-25 produced by Amoco Oil Company, having a refractive index of 1.4270 at 80° C., and oil content of 0.24%, specific gravity (at 60° F., 15.6° C.) of 0.839 and a flash point of 415° F. (212.8° C.) has been found to be particularly suitable.

The solvent for the solution applications of the lubricant composition according to the present invention are preferably aliphatic hydrocarbons with a rapid vaporization rate, but a flash point which is not so low as to present inordinate flammability dangers. Aliphatic hydrocarbons such as naphtha, heptane and hexane can be used. Lacolene TM produced by Ashland Chemical Company, an aliphatic naphtha having a flash point (Tag closed cup) of 22° F. (−5.6° C.), an initial boiling point of 195° F. (90.6° C.), a boiling range of 195° F. (90.6° C.) to 230° F. (110° C.), a specific gravity at 60° F. (15.6° C.) of 0.6919 to 0.7129, and a refractive index at 25° C. of 1.3940 has been found to be particularly suitable. To reduce flammability dangers, any of the above materials may be used in admixture with Freon ® solvents (duPont de Nemours and Co., Inc.).

As the electrical conducting base material, any electrical conductor which requires a lubricant can be treated according to the present invention, although the invention is particularly adapted to wire and specifically magnet wire. The wire is generally copper or aluminum and wires ranging anywhere from 2 to 128 mils in diameter, with wires 10 mils to 64 mils being the most commonly treated wires according to the present invention. The insulating wire coatings to which the lubricant is applied generally ranges from about 0.2 to about 2 mils in thickness, and generally about 0.7 mil to 1.6 miles. The polyamide-imide can be applied as a sole insulation coat or part of a multicoat system. Although any compatible base coat material can be used as part of the multicoat system, tris-hydroxyethyl-isocyanurate based polyester (preferably representing about 80% to about 90% by weight of the total wire coating) is the preferred base coat in conjunction with the polyamide-imide (preferably representing about 10% to about 20% by weight of the total wire coating) overcoat.

The lubricant can be applied by any conventional means such as coating dies, rollers or felt applicators. The preferred method of application utilizes a low boiling hydrocarbon solvent solution of the lubricant which can be applied with felt applicators and air dried, allowing a very thin "wash coat" film of lubricant to be applied to the wire. While the amount of lubricant in the coating composition may vary, it is most preferred to use approximately 1% to 3% of the lubricant dissolved in the aliphatic hydrocarbon solvent. And while any amount of lubricant coating desired can be applied, the coating is preferably applied to represent about 0.003% to about 0.004% by weight based on total weight of wire for copper wire, and about 0.009% to about 0.012% for aluminum wire.

EXAMPLE

A copper wire approximately 40 mils in diameter was coated with a first insulating layer of a THEIC based polyester condensation polymer of ethylene glycol, tris-hydroxyethyl isocyanurate and dimethylterephthalate. Over this was applied a layer of a polyamide-imide condensation polymer of trimellitic anhydride and methylene diisocyanate. The insulating layers were approximately 1.6 mils thick with 80% to 90% of the coating weight constituted by the polyester basecoat, and 10% to 20% by the polyamide-imide topcoat.

500 grams of paraffin wax (Eskar R-25) was added to 300 grams of beeswax (Mismo) and 750 grams of oleic acid. The material was added to approximately 9844 grams of aliphatic hydrocarbon solvent (Lacolene) along with 10 grams of nonionic fluorcarbon surfactant (FC-432). The resulting solution had a clear appearance, a specific gravity at 25° C. of 0.714, and an index refraction at 25° C. of 1.4005–1.4008. The solvent was heated to a point below its boiling point to approximately 135° F.–137° F. (57° C.–58° C.). The wax was slowly brought to its melting point and added to the ward solvent. The beeswax was similarly slowly brought to its melting point and added to the warm solvent. The oleic acid and fluorocarbon surfactant were then added in similar fashion. The blend was mixed thoroughly for 5 minutes. The polyamide-imide overcoated THEIC polyester wire has run between two felt pads partially immersed in the above formulated lubricant composition at a rate of about 55 feet per minute (16.5 M/min) and the thus applied coating air dried. The lubricant represented about 0.003% to about 0.004% by weight of the entire weight of the wire. These windings of the thus coated wire were then power inserted simultaneously into the stators with less than 2000 pounds of force on the insertion head with no damage to the insulated magnet wire.

As described above, problems have been incurred with the use of polyamide-imide insulated magnet wire in attempts to power insert multiple windings. Previously, it was felt that coefficient of friction testing was sufficient for predicting the feasibility of power inserting a particular magnet wire into coil slots. However, it has now been found that in addition to coefficient of friction testing, testing which measures coating lubricity and wire conformability is also required for true power insertion predictability. For example, in tests where both lubricant treated nylon and lubricant treated polyamide-imide coatings had identical coefficients of friction, the nylon could be made to successfully power insert and the polyamide-imide couldn't. The compositions of the present invention provide the necessary coefficient of friction, lubricity and wire conformability properties to the insulated magnet wires.

While many of these components have been used as lubricants, and even as lubricants in the insulated electrical wire field, there is no way to predict from past performance how such lubricants would react to power insertion in coil slots. Accordingly, it is quite surprising that the combination of such conventional materials in the ranges prescribed would allow multiple winding power insertion of polyamide-imide material hitherto believed to be incapable of such successful power insertion. In fact, it is also quite surprising that the polyamide-imide insulated wire can be power inserted at such low pressures (i.e. less than 3000 pounds of force).

Magnet wire in this environment must also be able to maintain a maximum voltage level even in high humidity or "water test" conditions. Since polyamide-imide insulated manget wires are known to be more water resistant than nylons, the lubricant of the present invention provides this additional benefit in the area of power insertable wire. Another important advantage with lubricants according to the present invention is in the area of hermetic motors. In the past, the use of lubricant coated, power inserted coils has been avoided in this area because of the potential for clogging of capillary tubes by the lubricant in the environment the hermetic motors are used in. However, the lubricants according to the present invention are substantially 100% removed in the course of the ordinary (300° F.) 150° C., eight hour varnish curing operation in the hermetic motor manufacturing process.

Although the invention has been primarily described in terms of the advantage of being able to power insert multiple windings of polyamide-imide insulated magnet wire according to the present invention, the lubricants of the present invention impart advantages to the magnet wires even when they are not used with power insertion equipment. For example for those wires which are not power inserted, much improved windability is imparted to such wires, also resulting in less damage to the wires than with other lubricants.

Although the invention has been shown and described with respect to detailed embodiments thereof, it will be understood by those skilled in the art that various changes in form and detail thereof may be made without departing from the spirit and scope of the claimed invention.

We claim:

1. A lubricated magnet wire comprising an electrically conducting substrate having an electrically insulating polyamide-imide outer coating, and a lubricant coating on the polyamide-imide outer coating comprising oleic acid, beeswax, fluorocarbon surfactant, and paraffin wax, the coated magnet wire capable of multiple winding power insertion into coil slots without damage to the polyamide-imide outer coating.

2. The wire of claim 1 wherein the fluorocarbon surfactant is present in about 0.06% to about 39% by weight, the beeswax about 3.2% to about 56.8% by weight, and the balance of lubricant components being oleic acid and paraffin wax present in a ratio of about 1.5 to 1 by weight.

3. The wire of claim 1 having an electrically insulating layer of polyester between the substrate and the polyamide-imide outer coating.

* * * * *